(12) United States Patent
Dyer et al.

(10) Patent No.: US 9,464,645 B2
(45) Date of Patent: Oct. 11, 2016

(54) PULL THEN LIFT HOLD OPEN ROD LOCK MECHANISM

(71) Applicant: MarathonNorco Aerospace, Inc., Waco, TX (US)

(72) Inventors: Ben Dyer, Waco, TX (US); Brian Star, Waco, TX (US); Del Latham, Waco, TX (US)

(73) Assignee: MarathonNorco Aerospace, Inc., Waco, TX (US)

( * ) Notice: Subject to any disclaimer, the term of this patent is extended or adjusted under 35 U.S.C. 154(b) by 0 days.

(21) Appl. No.: 14/663,227

(22) Filed: Mar. 19, 2015

(65) Prior Publication Data

US 2015/0267724 A1 Sep. 24, 2015

Related U.S. Application Data (60) Provisional application No. 61/955,528, filed on Mar. 19, 2014.

(51) Int. Cl.
*F15B 15/26* (2006.01)
(52) U.S. Cl.
CPC .................................. *F15B 15/261* (2013.01)
(58) Field of Classification Search
CPC .................. F15B 15/261; F15B 2015/267
See application file for complete search history.

(56) References Cited

U.S. PATENT DOCUMENTS

| | | | | |
|---|---|---|---|---|
| 4,295,413 A | * | 10/1981 | Kamimura | F15B 15/261 92/24 |
| 5,050,484 A | * | 9/1991 | Kamimura | F15B 15/261 91/41 |
| 7,654,371 B1 | | 2/2010 | Metz et al. | |
| 2010/0024161 A1 | | 2/2010 | Wood et al. | |
| 2011/0244995 A1 | | 10/2011 | Chen | |
| 2013/0206955 A1 | | 8/2013 | Palma et al. | |

OTHER PUBLICATIONS

International Search Report and Written Opinion mailed Jun. 24, 2015 in International Application No. PCT/US2015/021567.

* cited by examiner

*Primary Examiner* — F. Daniel Lopez
(74) *Attorney, Agent, or Firm* — Baker & Hostetler LLP (57) ABSTRACT

A hold open rod includes an inner tube assembly coupled to an outer tube assembly, the inner tube assembly movable within the outer tube assembly, a lock body coupled to the outer tube assembly, and an inner collar coupled to the lock body, the inner collar having a lock groove and unlock groove. The hold open rod further includes a locking dog configured to engage the unlock groove when the hold open rod is in an unlocked configuration and the locking dog further configured to engage the lock groove when the hold open rod is in a locked configuration, an unlocked indicator on a first region of the lock body, the unlocked indicator exposed when the hold open rod is in the unlocked configuration, and a first rod end coupled to the outer tube assembly and a second rod end coupled to the inner rod assembly.

25 Claims, 8 Drawing Sheets

PULL THEN LIFT HOLD OPEN ROD LOCK MECHANISM

CROSS REFERENCE TO PRIOR APPLICATIONS

This application claims the benefit from U.S. Provisional Application No. 61/955,528 filed on Mar. 19, 2014, which is hereby incorporated by reference for all purposes as if fully set forth herein.

FIELD OF THE DISCLOSURE

The disclosure relates to a lock mechanism. More particularly, the disclosure relates to a lock mechanism that may be implemented with a hold open rod.

BACKGROUND OF THE DISCLOSURE

Hold open rods are well known in both the automotive and aviation industries. Hold open rods may be used to hold a door or hatch open after the door or hatch has been opened manually or automatically. Hold open rods may support a considerable amount of weight depending on the type of door being held open. It is desired that the rods function correctly and do not malfunction when supporting this weight.

Generally, hold open rods may include two cylindrical, telescoping tubes with an inner tube located inside of an outer tube. Alternatively, hold open rods may include two tubes having a square cross-section, hexagonal cross-section, or the like. When in a stowed position, the inner tube is located almost entirely within the outer tube. When in use, the inner tube may be extended to a designated position in order to hold open the door. In the extended position, the tubes may be locked in place in order to hold the door open. A lock mechanism may be used to prevent the inner tube from retracting into the outer tube.

A hold open rod may require more than one maintenance personnel to operate. This increases costs to end-users and complicates the operation of the hold open rod. Some one-man operational designs require an external remote release mechanism, which greatly complicates the design.

Accordingly, it is desirable to have a hold open rod with a simple lock mechanism that may be operated by a single user. In particular, it is desirable to have a simple lock mechanism that is entirely self-contained within the hold open rod.

SUMMARY OF THE INVENTION

In order to minimize costs, many end users are seeking to maximize the number of one-man operations involved with the maintenance of an aircraft. The hold open rod of the disclosure allows a single mechanic or technician to safely close the aircraft door. The hold open rod lock mechanism may be partially disengaged while the mechanic is between the door and the engine. He may then exit and complete the unlocking operation from outside the door by lifting it to finish releasing the hold open rod before closing the door.

The foregoing needs are met, to a great extent, by the disclosure, wherein a hold open rod includes an inner tube assembly coupled to an outer tube assembly with the inner tube assembly movable within the outer tube assembly. The hold open rod may further include a lock body coupled to the outer tube assembly and an inner collar coupled to the lock body. The inner collar may have a lock groove and unlock groove. The hold open rod may further include a locking dog configured to engage the unlock groove when the hold open rod is in an unlocked configuration. The locking dog may further be configured to engage the lock groove when the hold open rod is in a locked configuration. The unlocked indicator may be on a first region of the lock body, and the unlocked indicator may be exposed when the hold open rod is in the unlocked configuration. The locked indicator may also be on the lock body and may be exposed when the hold open rod is in the locked configuration. The hold open rod may also include a first rod end coupled to the outer tube assembly and a second rod end coupled to the inner rod assembly.

In one aspect, a hold open rod includes an inner tube assembly coupled to an outer tube assembly, the inner tube assembly movable within the outer tube assembly, an inner collar having a lock groove and unlock groove, an outer collar assembly coupled around the inner collar, a first spring located within the outer collar assembly configured to engage the inner collar, a locking dog configured to engage the unlock groove when the hold open rod is in an unlocked configuration and the locking dog further configured to engage the lock groove when the hold open rod is in a locked configuration, and a first rod end coupled to the outer tube assembly and a second rod end coupled to the inner tube assembly.

The hold open rod may further include a lock body coupled to the outer tube assembly, and a locked indicator and an unlocked indicator. The locked indicator and unlocked indicator may include each at least one of a visual indicator and a tactile indicator formed on the lock body. The locked indicator may be exposed when the hold open rod is in the locked configuration and is concealed when the hold open rod is in the unlocked configuration, and where the unlocked indicator is exposed when the hold open rod is in the unlocked configuration and is concealed when the hold open rod is in the locked configuration. The locked indicator and unlocked indicator may each include at least one of a visual indicator and a tactile indicator formed on the outer tube assembly or the lock body. The hold open rod may further include a collar locking pin configured to engage a groove on the lock body or the outer tube when the hold open rod changes from the locked configuration to the unlocked configuration. The hold open rod may further include an outer collar assembly configured to hold the collar locking pin and the inner collar. The hold open rod may further include a second spring arranged within the outer collar assembly and around the lock body, where the second spring is compressed when the hold open rod is in the unlocked configuration. The first spring may be located between the second spring and the inner collar. The inner collar may be located between the first spring and the second spring. A movable aircraft structure may include the hold open rod. The hold open rod may include a reset groove and an inner lock groove formed on an outer surface of the inner tube assembly, where a first outer diameter of the inner lock groove is greater than a second outer diameter of the reset groove. The hold open rod may further include a reset groove and an inner lock groove formed on an outer surface of the inner tube assembly, where a first outer diameter of the inner lock groove is less than a second outer diameter of the reset groove. The locking dog may be configured to engage the inner lock groove when the hold open rod is in the locked configuration. The locking dog may be further configured to engage the lock groove when it engages the inner lock groove. The locking dog may be configured to engage the reset groove when the hold open rod changes from the locked configuration to the unlocked configuration. The locking dog may be further configured to transit past a no-unlock feature when the hold open rod changes from the locked configuration to the unlocked configuration. The locking dog may be configured to engage the reset groove when the hold open rod changes from the unlocked configuration to the locked configuration. The locking dog may be further configured to transit past a no-unlock feature when the hold open rod changes from the unlocked configuration to the locked configuration. The locking dog may be made from a polyamide-imide material. The locking dog may be reinforced with at least one of the following: glass fiber and carbon fiber. The hold open rod may further include at least one wear ring located around at least one of the following: the inner tube assembly, the lock body, and the inner collar. At least one edge of the locking dog, at least one edge of the lock groove, and at least one edge of the unlock groove may be beveled. The locking dog may be formed from a linear element with a bevel. The locking dog may be formed from a segmented circle. The hold open rod may further include a collar locking pin housing configured to house the collar locking pin. The collar locking pin may have a substantially flat bottom surface. The hold open rod may further include a lock body cap arranged within the outer collar assembly, the lock body cap being engaged by the first spring. The first spring and the second spring may be wave springs. The hold open rod may further include a set screw coupled to a screw wheel configured to move within a wheel passage.

In another aspect, a hold open rod may include an inner tube assembly coupled to an outer tube assembly, the inner tube assembly movable within the outer tube assembly, an inner collar having a lock groove and unlock groove, an outer collar assembly coupled around the inner collar, a set screw coupled to a screw wheel configured to move within a wheel passage, a locking dog configured to engage the unlock groove when the hold open rod is in an unlocked configuration and the locking dog further configured to engage the lock groove when the hold open rod is in a locked configuration, and a first rod end coupled to the outer tube assembly and a second rod end coupled to the inner tube assembly.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the invention.

DETAILED DESCRIPTION

The disclosure will now be described with reference to the drawing figures, in which like reference numerals refer to like parts throughout. Various aspects of the disclosure advantageously provide a lock mechanism that allows a single mechanic or technician to safely close the aircraft door.

Figure 1:
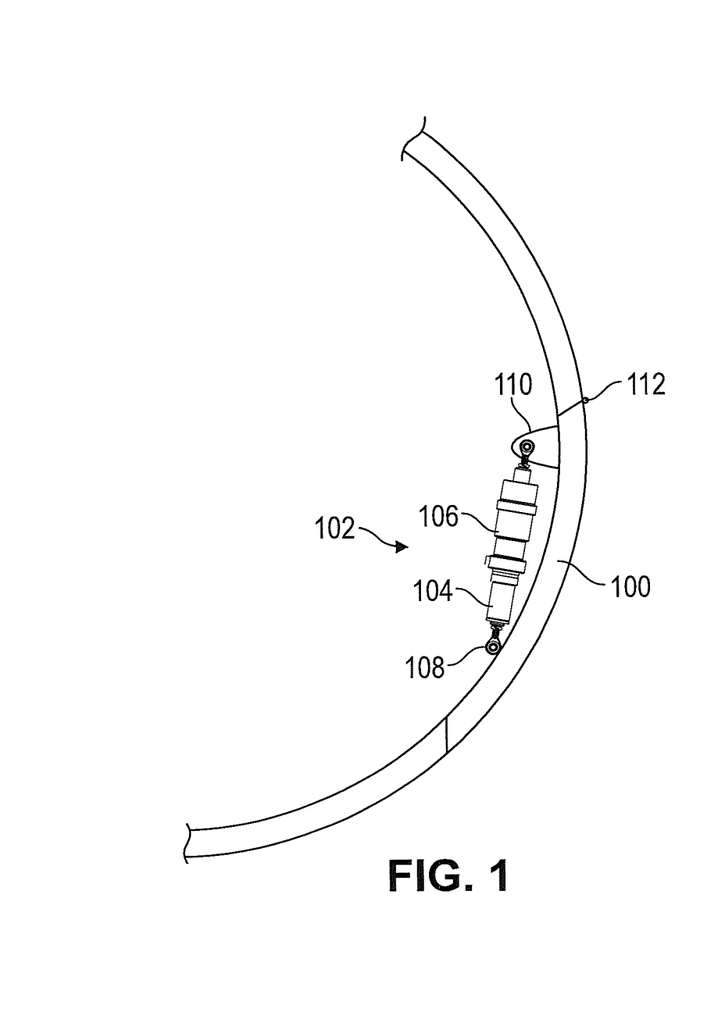
FIG. 1 is a cross-sectional view illustrating a door in a closed configuration suitable for use with a hold open rod according to one aspect of the disclosure.

FIG. 1 is a cross-sectional view illustrating a door 100, hatch, etc. in a closed configuration suitable for use with a hold open rod 102 according to an aspect of the disclosure. The door 100 may be located in a vehicle such as an aircraft, bus, ship, train, or the like. As illustrated in FIG. 1, the door 100 may be located in a fuselage of an aircraft. In other aspects, the door 100 may be an access panel, radome door, cover, cowling, etc. for an engine nacelle, luggage compartment, or other compartment in an aircraft, vehicle, etc. In addition, the hold open rod 102 may be used in other structures such as buildings. However, due to the advantageous reduction in weight and ease of maintenance, the hold open rod 102 may be particularly useful in aircraft and other types of vehicles. The hold open rod 102 may be made from various metallic materials such as aluminum, steel, titanium, and the like. Moreover, the open rod 102 may be formed of nonmetallic materials such as Kevlar, carbon fiber fiberglass, various resins, and the like. Implementation using nonmetallic materials may be preferable in some areas such as a radome to avoid interference with transmission and reception.

The hold open rod 102 may include an inner tube 104 and an outer tube 106. The inner tube 104 and outer tube 106 may be in axial alignment and slidable relative to one another in a telescoping manner. The hold open rod 102 may be attached to the door 100 by a door fitting 108 pivotally connected to the inner tube 104. The hold open rod 102 may be attached to the fuselage, engine nacelle, etc. by a bracket 110 that is pivotally connected to the outer tube 106. A converse attachment orientation is also contemplated by the disclosure.

Figure 2:
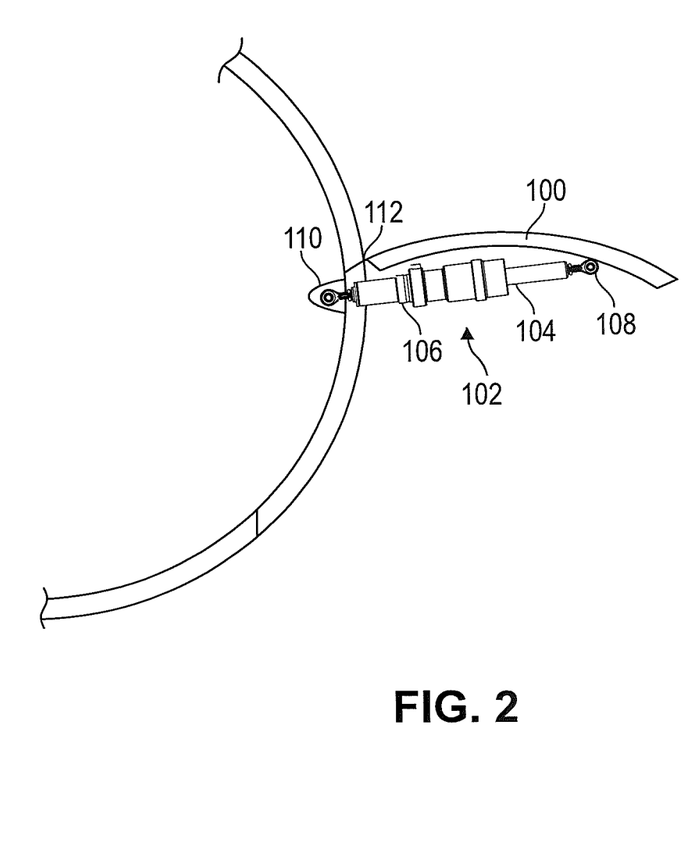
FIG. 2 is a cross-sectional view illustrating a door in an open configuration suitable for use with a hold open rod according to one aspect of the disclosure.

As shown in FIG. 2, the door 100 may swing open and upwards via a hinge 112. In response to the door 100 being opened, the inner tube 104 may telescope out from the outer tube 106. In the aspect illustrated in FIG. 2, the door 100 is configured to close at least by gravity acting on the door 100. In other aspects, the door 100 may be configured to close by a spring, an actuator, or another similar mechanism known in the art. The hold open rod 102 maintains the door 100 in an open position by providing resistance on the inner tube 104 to prevent the inner tube 104 from sliding into the outer tube 106.

Figure 3:
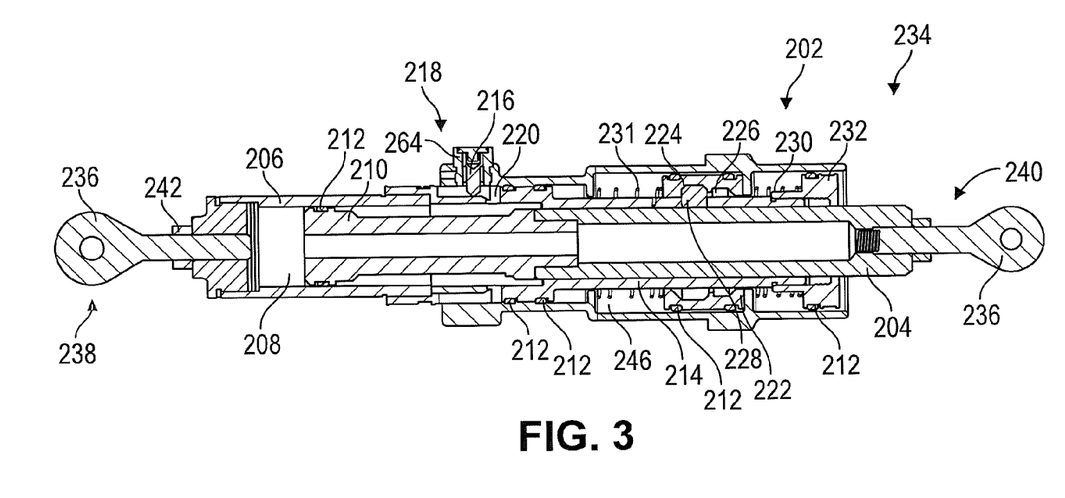
FIG. 3 is a cross-sectional view of a hold open rod in a stowed configuration according to one aspect of the disclosure.

FIG. 3 illustrates a cross-sectional view of a hold open rod 202 in a stowed position according to an aspect of the disclosure. The hold open rod 202 may be implemented consistent with the hold open rod 102 implementation shown in FIG. 1 and FIG. 2. The hold open rod 202 may be made from a metallic material, or a polyamide material, including aliphatic polyamides, polyphthalamides, aromatic polyamides, carbon fiberglass, or another type of thermoplastic compound. The hold open rod 202 may include an inner tube assembly 204 and an outer tube assembly 206. The inner tube assembly 204 may be configured to fit into a cavity 208 of the outer tube assembly 206. The inner tube assembly 204 may have a tube stop 210. The tube stop 210 may prevent the hold open rod 202 from extending to a point where the inner tube assembly 204 comes out of and separates from the outer tube assembly 206. The tube stop 210 may be attached to the inner tube assembly 204 in a variety of ways. For example, a pin or dowel may be used to connect the tube stop 210 to the inner tube assembly 204. In other aspects, the tube stop 210 may be attached by an adhesive, a mechanical fastener, threads or another method known in the art. Alternatively, the tube stop 210 may be integrated into the inner tube assembly 204.

The hold open rod 202 may also include a lock body 214 placed around an end of the outer tube assembly 206. The lock body 214 may receive a collar locking pin 216. The collar locking pin 216 may have a substantially flat bottom surface to minimize wear on the lock body 214 or the outer tube assembly 206. The collar locking pin 216 may be located at a first end 218 of the lock body 214. The collar locking pin 216 may be housed in a portion 264 of an outer collar assembly 246. The portion 246 may be a cylindrical housing that houses the locking pin 216. The portion 246 may further include a cylindrical inner portion having a spring arranged above the locking pin 216 to urge the locking pin 216 toward a groove 220. When the hold open rod 202 is in a stowed position, the collar locking pin 216 is disengaged from the groove 220 of the lock body 214. The collar locking pin 216 may engage the groove 220 during an unlocking process of the hold open rod 202, described in more detail below.

The lock body 214 and outer collar assembly 246 may also include an inner collar 222. The inner collar 222 may have an unlock groove 224 and a lock groove 226 with a no-unlock feature 225 arranged between the unlock groove 224 and lock groove 226. The no-unlock feature 225 may be a structure formed on the inner collar 222 separating the unlock groove 224 and the lock groove 226. A locking dog 228 may be configured to fit into and/or slide between the unlock groove 224 and lock groove 226. The no-unlock feature 225 may prevent the locking dog 228 from sliding between the unlock groove 224 and lock groove 226 when the hold open rod 202 is in a stowed or locked position. When the hold open rod 202 is in a stowed position, the locking dog 228 rests in the unlock groove 224. The unlock groove 224, the lock groove 226, the no-unlock feature 224, and the locking dog 228 may include chamfered, beveled, or curved radiused edges to assist in the movement of the locking dog 228 between the unlock groove 224 and the lock groove 226. The locking dog 228 may be formed from a linear element, such as a hexagonal prism, a segmented circle, a portion of a cylindrical ring, or cylinder, each with beveled edges. Although only one locking dog 228 is shown in FIG. 3, in some aspects, it may be desired to have additional locking dogs 228 to assist in the operation of the hold open rod 202. The locking dog 228 may be made from a polyamide-imide material, such as Torlon®, or a metal, such as an aluminum alloy, a copper alloy, steel, or the like. The locking dog 228 may also be reinforced with glass fiber, carbon fiber, or the like.

The hold open rod 202 may also include a primary spring 230 and an inner collar spring 231 arranged on each side of the inner collar 222. In another aspect, the primary spring 230 may be adjacent to the inner collar spring 231. In various aspects, the primary spring 230 and/or the inner collar spring 231 may be standard coil springs, wave springs, or another type of spring known in the art. The inner collar spring 231 may exert a force on one side of the inner collar 222 and urge the inner collar 222 to move toward the right as shown in FIG. 3. The primary spring 230 may apply a force directly on the outer collar assembly 246 and a lock body cap 232 in order to urge the outer collar assembly 246 and/or inner collar 222 to the left. The inner collar spring 231 may apply a force directly on the inner collar 222 and a portion of the outer collar assembly 246. The force of the springs 230, 231 is utilized in the locking and unlocking operations of the hold open rod 202 and discussed in more detail below. The lock body 214 may be fitted onto the outer tube assembly 206 utilizing threads, adhesive, mechanical fastener, or the like. The lock body cap 232 may be secured to the lock body 214 by threads, a dowel, pin, an adhesive, a mechanical fastener, or another method known in the art. In some aspects, the lock body 214 and lock body cap 232 may be implemented as a single component.

The hold open rod 202 may have rod ends 236 located at opposite ends 238, 240 of the inner tube assembly 204 and the outer tube assembly 206. The rod ends 236 may be any suitable fitting for attachment to the door 100, a frame of the door 100, or another similar surface. For example, the rod ends 236 may be eye bolts, rod end bearings, universal joints, clevis pins, quick disconnects, and the like. The rod ends 236 may be secured onto the inner tube assembly 204 and/or outer tube assembly 206 in any suitable manner. For example, the rod ends 236 may be threaded into a tapped bore, press fit, locked via a set screw, or another similar method. To further secure the rod ends 236, a lock nut 242 and a locking device 243 may also be utilized.

The hold open rod 202 may include a plurality of wear rings 212. It may desirable to place wear rings at various locations along the hold open rod 202, such as around the inner tube assembly 204, the outer tube assembly 206, the tube stop 210, the inner collar 222, and the lock body cap 232. The wear rings 212 may help improve the smoothness of the operation of the hold open rod 202 and decrease wear to the various aspects of the hold open rod 202. The wear rings 212 may also help prevent intrusion of sand and dust, or fluids, such as water, hydraulic fluid, lubricants, etc., during the life of the hold open rod 202. The wear rings may be made from a polyamide or polyamide-imide material, such as Nylon, Torlon™, or another suitable material.

Figure 4:
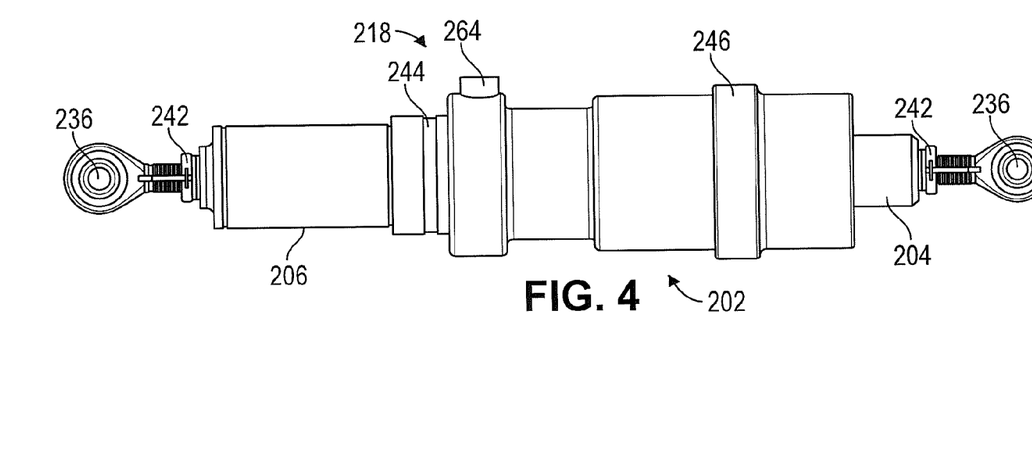
FIG. 4 is a side view of the hold open rod in a stowed configuration of FIG. 3.

FIG. 4 illustrates a side view of the hold open rod 202 in a stowed position. As described previously, the inner tube assembly 204 may be fully or partially retracted into the outer tube assembly 206. The outer collar assembly 246 may be oriented such that an unlocked indicator 244 on the lock body 214 becomes visible. The unlocked indicator 244 may be a visual indicator at a first end 218 of the lock body 214, such as a colored stripe or pattern, which becomes exposed when the hold open rod 202 is in a stowed and/or unlocked position. For example, the unlocked indicator 244 may be a red stripe. The unlocked indicator 244 may also be a tactile indicator, such as a knurled pattern, that is formed onto the lock body 214. A tactile indicator may allow maintenance personnel to determine the hold open rod 202 is unlocked in situations where visual observation of the unlocked indicator 244 is not possible, such as if the view is obstructed by another object or if there is insufficient lighting. The unlocked indicator may also be an illuminated pattern, such as formed from a fluorescent, phosphorescent, electroluminescent, or radioluminescent paint. The unlocked indicator 244 may also be a combination of a visual indicator and a tactile indicator.

Figure 5:
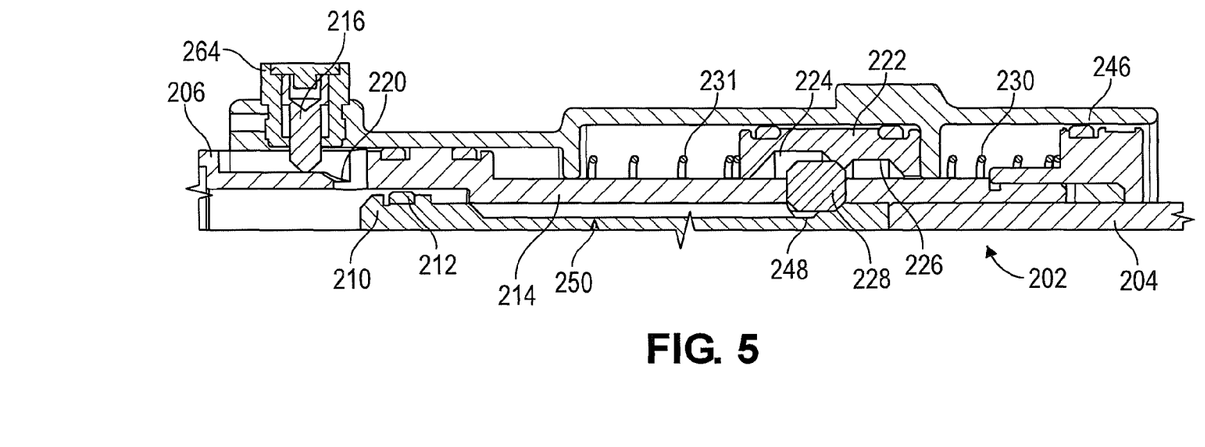
FIG. 5 is a partial cross-sectional view of the hold open rod of FIG. 3 in a locking sequence.
Figure 6:
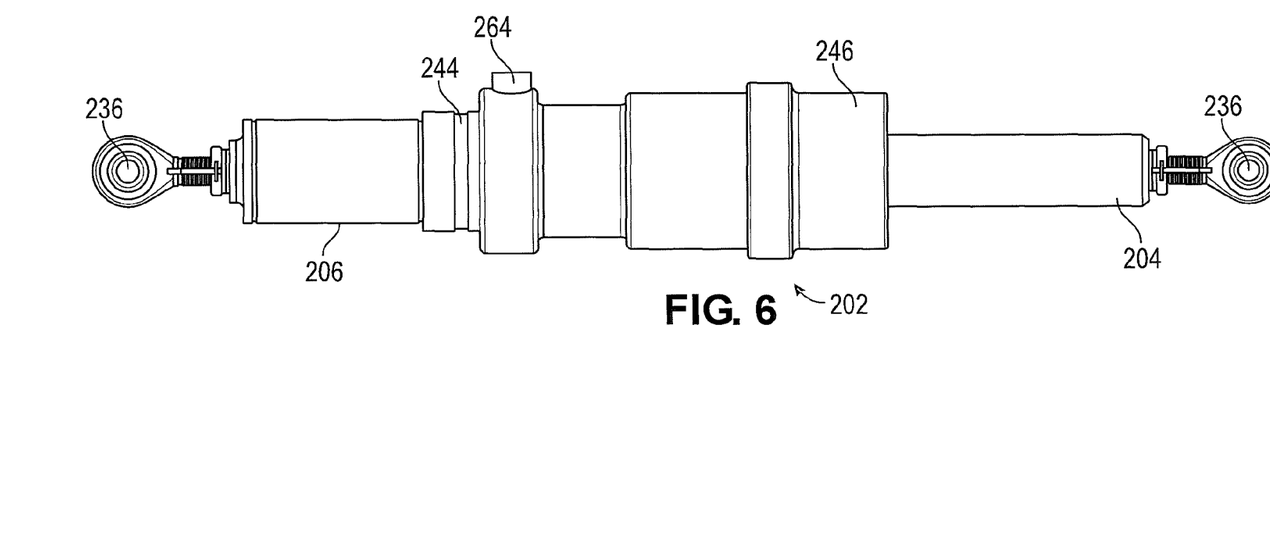
FIG. 6 is a side view of the hold open rod of FIG. 3 in a locking sequence.

FIGS. 5 and 6 illustrate a locking sequence of the hold open rod 202 in accordance to an aspect of the disclosure. To begin the locking sequence, the inner tube assembly 204 may be extended from the outer tube assembly 206 until it reaches a desired length. The unlocked indicator 244 may remain exposed on the outer tube assembly 206 as the hold open rod 202 has not reached a locked position. As the hold open rod 202 extends, the inner tube assembly 204 may move until the locking dog 228 comes into contact with inner lock groove 248 on the outside surface 250 of the inner tube assembly 204. Once the locking dog 228 contacts the inner lock groove 248, the primary spring 230 may cause the inner collar 222 and outer collar assembly 246 to move.

Figure 7:
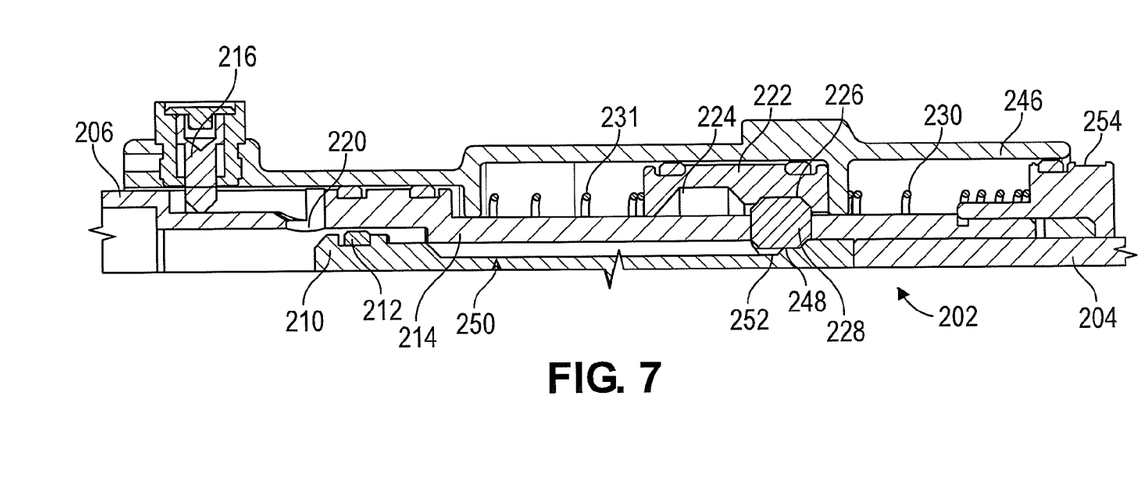
FIG. 7 is a partial cross-sectional view of a hold open rod of FIG. 3 in a locked configuration.
Figure 8:
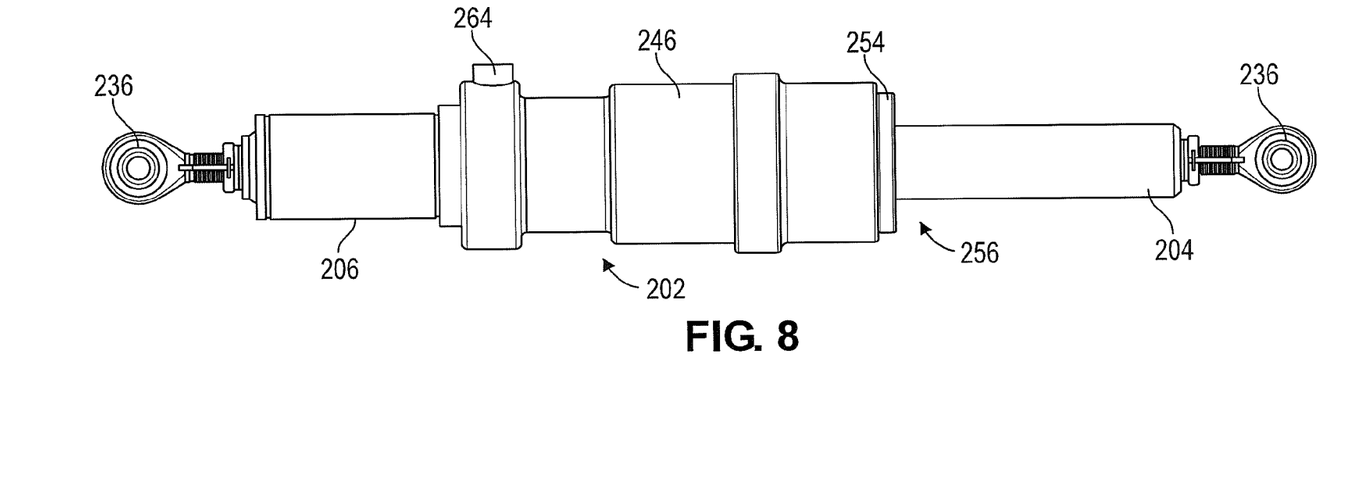
FIG. 8 is a side view of the hold open rod of FIG. 3 in a locking sequence.

FIGS. 7 and 8 illustrate a locking sequence of the hold open rod 202 in accordance to an aspect of the disclosure. As the inner tube assembly 204 extends, the locking dog 228 may come into contact with a reset groove 252 on the outer surface 250 of the inner tube assembly 204. The reset groove 252 may be deeper than the inner lock groove 248 and allow the locking dog 228 to move into the lock groove 226. As the locking dog 228 moves into the lock groove 226 past the no-unlock feature 224, compression of the primary spring 230 may cause the inner lock groove 248 to apply a force on the locking dog 228. There may be an upward force acting on the locking dog 228 that locks the locking dog 228 in compression with the lock groove 226. Because of the compression of the primary spring 230, the primary spring 230 may also act on the inner collar 222 and cause a locked indicator 254 to become exposed at a second end 256 of the lock body 214 due to movement of the inner collar 222 and outer collar assembly 246. In other aspects, the locked indicator may be formed on the same side as the unlocked indicator.

The locked indicator 254 provides visual and/or tactile indication that the hold open rod 202 is in a locked position. Similar to the unlocked indicator 244, the locked indicator 254 may be a visual indicator, such as a colored stripe or pattern, which becomes exposed when the hold open rod 202 is in a locked position. For example, the locked indicator 254 may be a green stripe. The locked indicator 254 may also be an illuminated pattern, such as formed from a fluorescent, phosphorescent, electroluminescent, or radioluminescent paint. The locked indicator 254 may also be a tactile indicator, such as a knurled pattern, that is formed onto the outer tube assembly 206 or lock body 214. The unlocked indicator 244 may also be a combination of a visual indicator and a tactile indicator.

Figure 9:
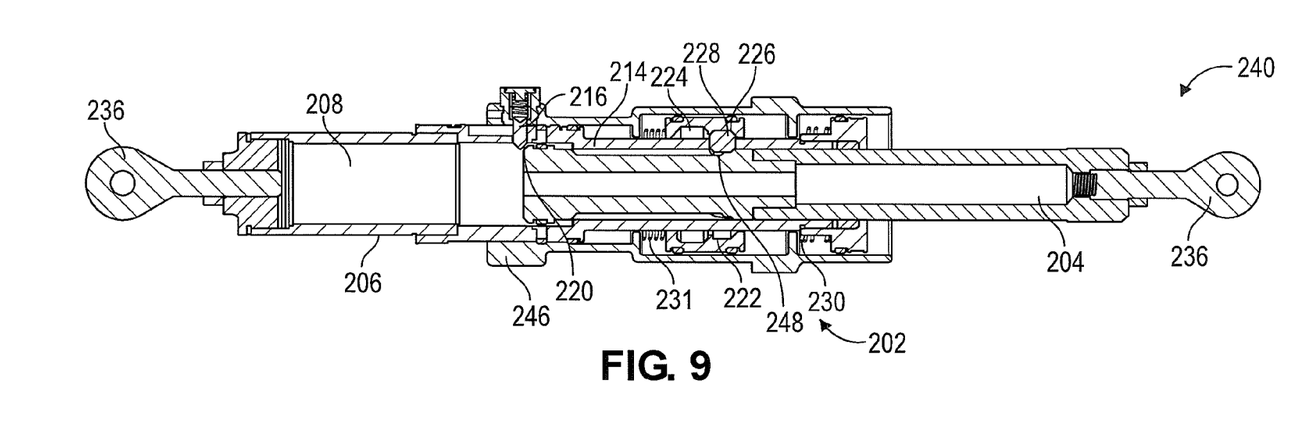
FIG. 9 is a cross-sectional view of a hold open rod of FIG. 3 in an unlocking sequence.
Figure 10:
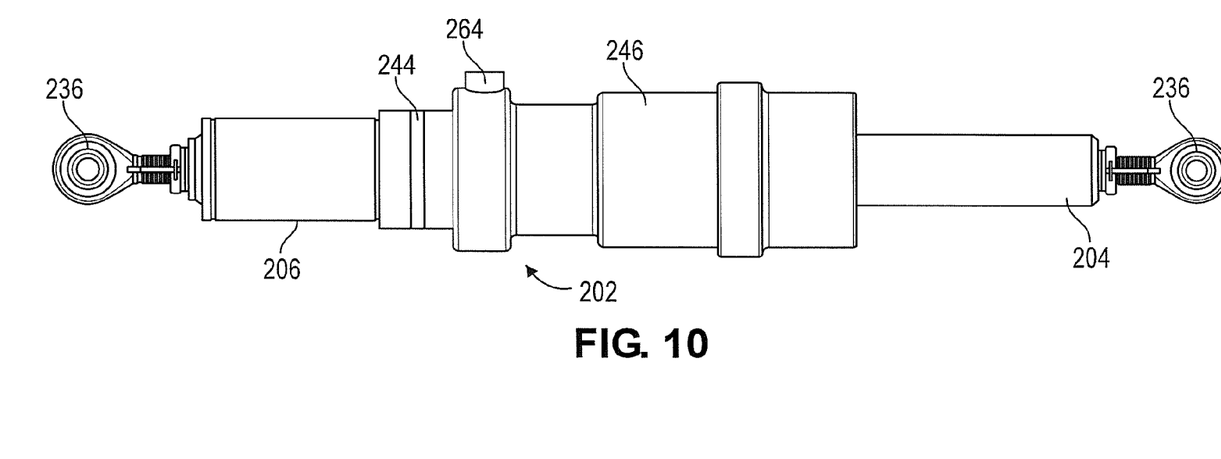
FIG. 10 is a side view of the hold open rod of FIG. 3 in an unlocking sequence of FIG. 9.

FIGS. 9 and 10 illustrate an unlocking sequence of the hold open rod 202 in accordance to an aspect of the disclosure. To begin the unlocking sequence, an operator may move the outer collar assembly 246 towards the end 240 of the inner tube assembly 204. The movement of the outer collar assembly 246 may cause the locked indicator 254 to be concealed and expose the unlocked indicator 244 to indicate the hold open rod 202 has switched from a locked position to an unlocked position. As the outer collar assembly 246 moves towards the end 240 of the inner tube assembly 204, the collar locking pin 216 may engage with the groove 220 on the lock body 214. The primary spring 230 may be compressed due to the movement of the outer collar assembly 246. The inner collar 222 may remain stationary relative to the inner tube assembly 204, and the locking dog 228 may still be engaged in the lock groove 226 and inner lock groove 248. This may cause the inner collar spring 231 to become compressed due to the movement of the outer collar assembly 246.

Figure 11:
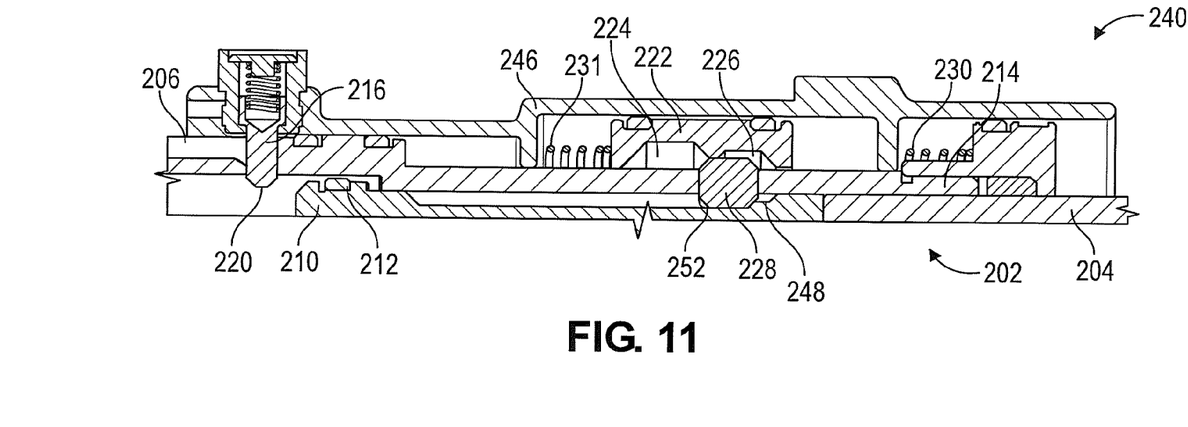
FIG. 11 is a partial cross-sectional view of the hold open rod of FIG. 3 in an unlocking sequence.

FIG. 11 illustrates a continuation of the unlocking sequence of the hold open rod 202 in accordance with an aspect of the disclosure. As the inner tube assembly 204 becomes extended, the reset groove 252 may engage the locking dog 228 to allow the locking dog 228 to move downward and away from the lock groove 226 and travel towards the unlock groove 224. As the locking dog 228 disengages from the lock groove 226, the inner collar 222 may be free to move towards the end 240 of the inner tube assembly 204 due to the spring force by the inner collar spring 231. The collar locking pin 216 may continue to engage the groove 220 along the outer tube assembly 206.

Figure 12:
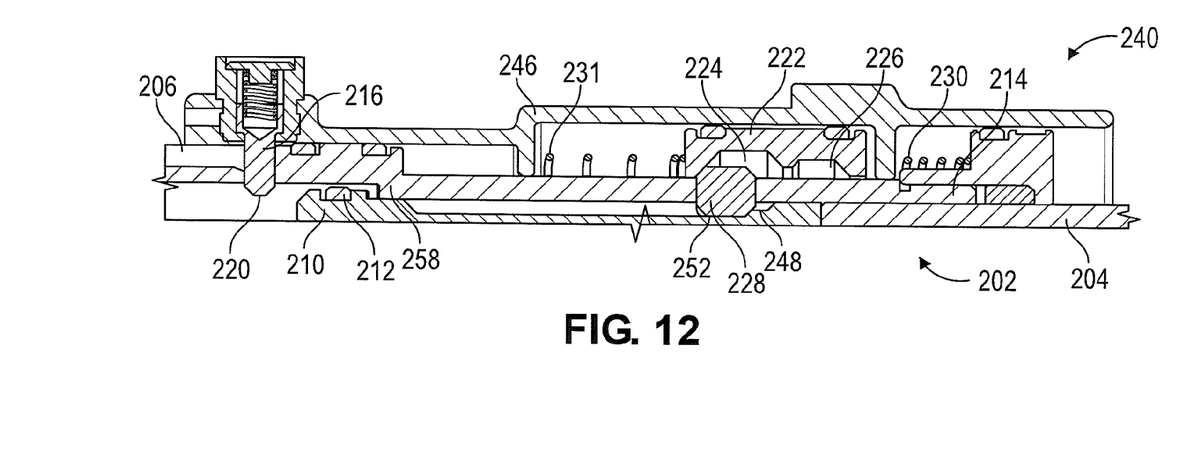
FIG. 12 is a partial cross-sectional view of the hold open rod of FIG. 3 in an unlocking sequence.

FIG. 12 illustrates the continuation of the unlocking sequence of the hold open rod 202 in accordance with an aspect of the disclosure. The inner collar spring 231 may continue to apply a spring force on the inner collar 222. The locking dog 228 may continue to engage the reset groove 252 and move from the lock groove 226 until it reaches the unlock groove 224, motion of the inner collar 222 may be driven by the inner collar spring 231 or gravity. The collar locking pin 216 may continue to engage the groove 220 and hold the outer collar assembly 246 static relative to the outer tube assembly 206 and/or lock body 214. The inner collar 222 and inner tube assembly 204 may stop moving once the locking dog 228 engages the unlock groove 224. The locking dog 228 may engage the unlock groove 224 before the tube stop 210 comes into contact with a flange 258 on the lock body 214. In some aspects, the flange 258 may be located on the outer tube assembly 206. In the event the inner tube assembly 204 continues to extend beyond an intended length, the flange 258 may prevent overextension of the inner tube assembly 204 due to contact with the tube stop 210. In another aspect, the locking dog 228 may restrict extension of inner tube assembly 204.

Figure 13:
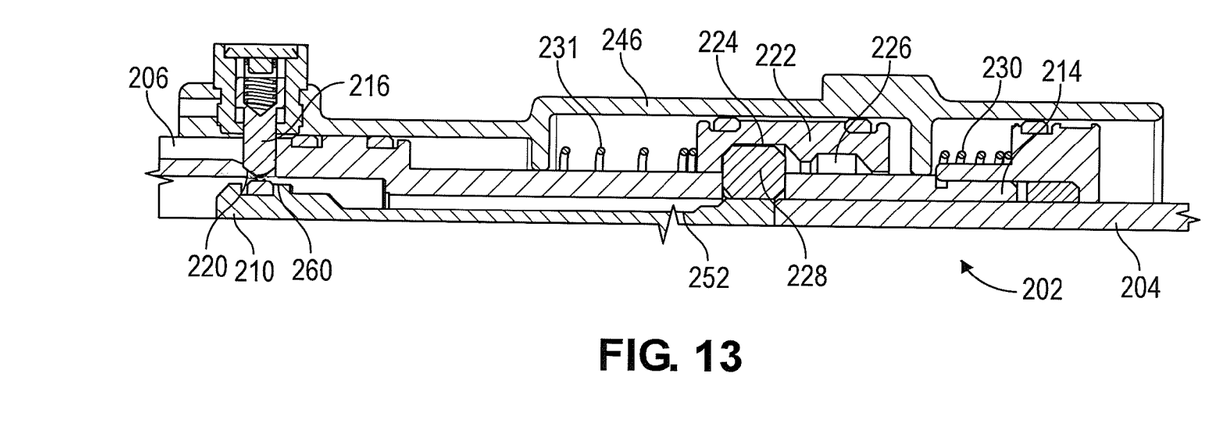
FIG. 13 is a partial cross-sectional view of the hold open rod of FIG. 3 in an unlocking sequence.
Figure 14:
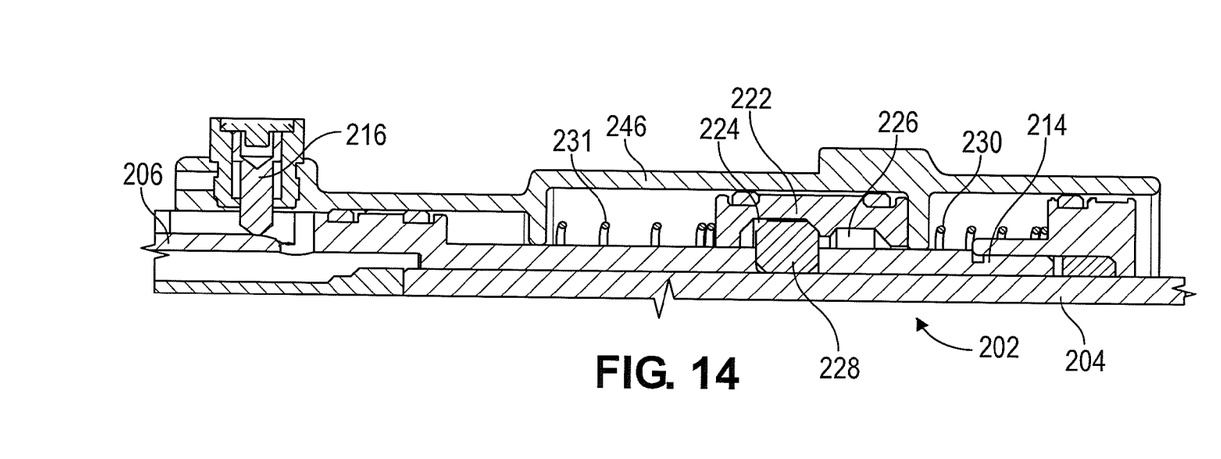
FIG. 14 is a partial cross-sectional view of the hold open rod of FIG. 3 in an unlocking sequence.

FIGS. 13 and 14 illustrate a continuation of the unlocking sequence of the hold open rod 202 in accordance with an aspect of the disclosure. The primary spring 230 may apply a spring force on the outer collar assembly 246. As the inner tube assembly 204 retracts, an inner tube adapter 260 on the tube stop 210 may engage the collar locking pin 216 and cause the collar locking pin 216 to release from the groove 220. The movement of the inner tube assembly 204 may also cause the locking dog 228 to disengage from the reset groove 252 and continue to engage the unlock groove 224. The hold open rod 202 continues to retract until it reaches the stowed position illustrated in FIG. 14.

Figure 15:
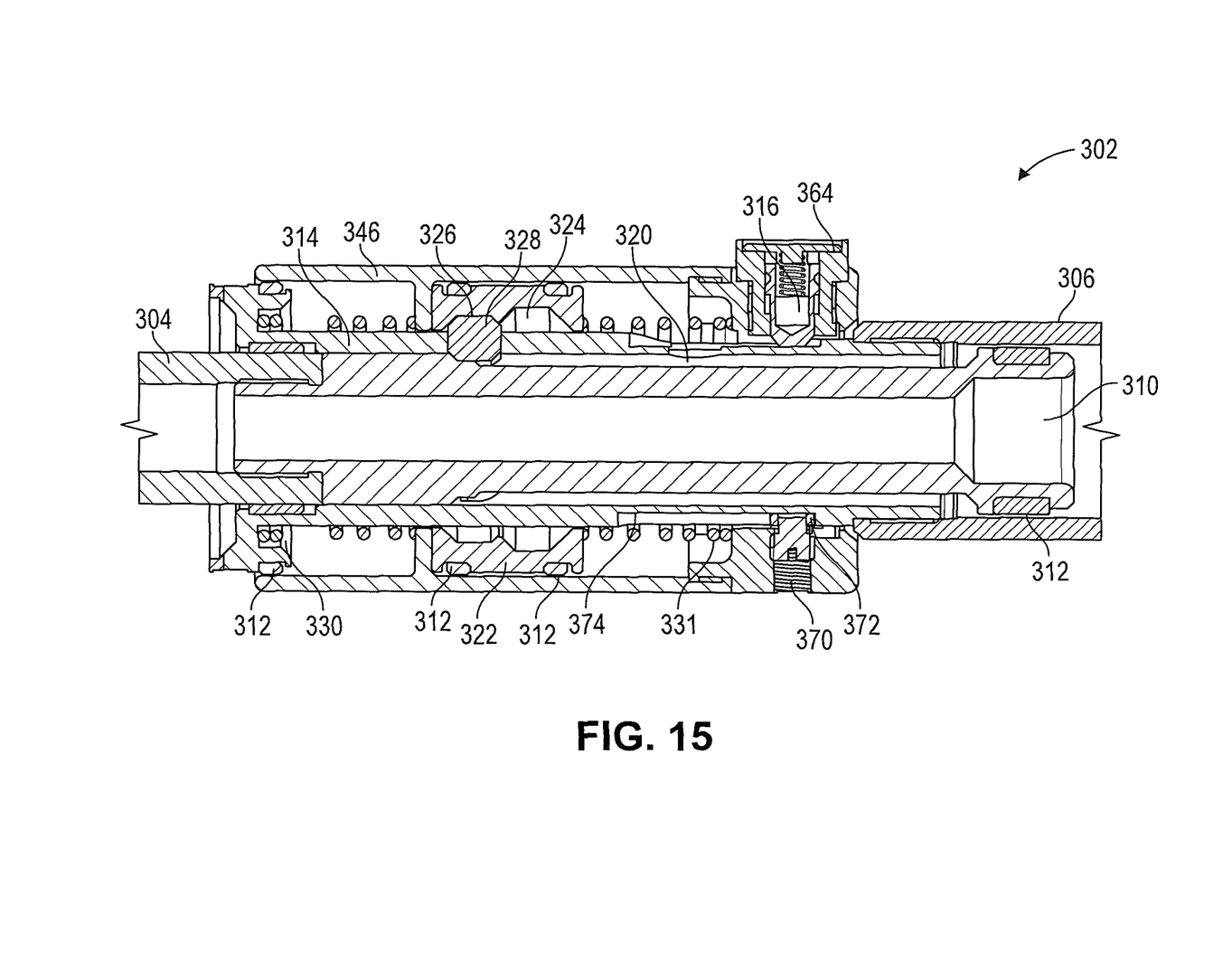
FIG. 15 is a partial cross-sectional view of a hold open rod according to another aspect of the disclosure.

FIG. 15 illustrates a hold open rod 302 in accordance with another aspect of the disclosure. Similar to the hold open rod 202 illustrated in FIGS. 3-14, the hold open rod 302 may include an inner tube assembly 304 movable within an outer tube assembly 306. The inner tube assembly 304 includes a tube stop 310 at one end. The hold open rod 302 also includes an outer collar assembly 346 with a collar locking pin 316 coupled to a portion 364 configured to engage a groove 320. The outer collar assembly 346 may be coupled around a lock body 314. Inside of the outer collar assembly 346, there may be an inner collar 322 with a unlock groove 324 and a lock groove 326. There may also be a locking dog 328 configured to engage the unlock groove 324 and lock groove 326. On each side of the inner collar 322, there may be a primary spring 330 and an inner collar spring 331. The hold open rod 302 may also include a plurality of wear rings 312 to minimize wear in the hold open rod 302. The hold open rod 302 may also be operated in a similar manner as described with respect to the hold open rod 202 above in reference to FIGS. 3-14.

The hold open rod 302 may include a set screw 370 located within the outer collar assembly 346. The set screw may include a screw wheel 372 coupled to the end of the set screw 370. The set screw 370 may be configured to slide along a screw groove 374 formed on the lock body 314 by the screw wheel 372. The set screw 370 may help protect against abuse loads on the hold open rod 302. In this regard, adjustment of the set screw 370 may reduce undesirable movement of the lock body 314 thus reducing the likelihood of damage due to the undesirable movement.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A hold open rod, comprising:
   an inner tube assembly coupled to an outer tube assembly, the inner tube assembly movable within the outer tube assembly;
   an inner collar having a lock groove and unlock groove;
   an outer collar assembly coupled around the inner collar;
   a first spring located within the outer collar assembly configured to engage the inner collar;
   a locking dog configured to engage the unlock groove when the hold open rod is in an unlocked configuration and the locking dog further configured to engage the lock groove when the hold open rod is in a locked configuration; and
   a first rod end coupled to the outer tube assembly and a second rod end coupled to the inner tube assembly;
   a lock body coupled to the outer tube assembly; and
   a locked indicator connected to the lock body and an unlocked indicator connected to the lock body,
   wherein the locked indicator is exposed when the hold open rod is in the locked configuration and is concealed when the hold open rod is in the unlocked configuration, and wherein the unlocked indicator is exposed when the hold open rod is in the unlocked configuration and is concealed when the hold open rod is in the locked configuration.

2. The hold open rod of claim 1, wherein the locked indicator and unlocked indicator are each at least one of a visual indicator and a tactile indicator formed on the lock body.

3. A movable aircraft structure comprising the hold open rod of claim 1, wherein the hold open rod is connected to the aircraft structure; and wherein the aircraft structure comprises at least one of the following: a door or a hatch.

4. The hold open rod of claim 1, further comprising a reset groove and an inner lock groove formed on an outer surface of the inner tube assembly,
   wherein a first outer diameter of the inner lock groove is greater than a second outer diameter of the reset groove.

5. The hold open rod of claim 4, wherein the locking dog is configured to engage the inner lock groove when the hold open rod is in the locked configuration.

6. The hold open rod of claim 5, wherein the locking dog is configured to engage the reset groove when the hold open rod changes from the locked configuration to the unlocked configuration.

7. The hold open rod of claim 6, wherein the locking dog is further configured to transit past a no-unlock feature when the hold open rod changes from the locked configuration to the unlocked configuration.

8. The hold open rod of claim 5, wherein the locking dog is configured to engage the reset groove when the hold open rod changes from the unlocked configuration to the locked configuration.

9. The hold open rod of claim 8, wherein the locking dog is further configured to transit past a no-unlock feature when the hold open rod changes from the unlocked configuration to the locked configuration.

10. The hold open rod of claim 9, further comprising a lock body cap arranged within the outer collar assembly, the lock body cap being engaged by the first spring.

11. The hold open rod of claim 1, wherein the locking dog is made from a polyamide-imide material.

12. The hold open rod of claim 11, wherein the locking dog is reinforced with at least one of the following: glass fiber and carbon fiber.

13. The hold open rod of claim 1, further comprising at least one wear ring located around at least one of the following: the inner tube assembly, the lock body, and the inner collar.

14. The hold open rod of claim 1, wherein at least one edge of the locking dog, at least one edge of the lock groove, and at least one edge of the unlock groove are beveled.

15. The hold open rod of claim 1, wherein the locking dog is formed from a linear element with a bevel.

16. The hold open rod of claim 1, further comprising a set screw arranged within the outer collar assembly, the set screw coupled to a screw wheel configured to move within a wheel passage.

17. A hold open rod, comprising:
an inner tube assembly coupled to an outer tube assembly, the inner tube assembly movable within the outer tube assembly;
an inner collar having a lock groove and unlock groove;
an outer collar assembly coupled around the inner collar;
a first spring located within the outer collar assembly configured to engage the inner collar;
a locking dog configured to engage the unlock groove when the hold open rod is in an unlocked configuration and the locking dog further configured to engage the lock groove when the hold open rod is in a locked configuration;
a first rod end coupled to the outer tube assembly and a second rod end coupled to the inner tube assembly;
a lock body coupled to the outer tube assembly;
a locked indicator connected to the lock body and an unlocked indicator connected to the lock body; and
a collar locking pin configured to engage a groove on the lock body when the hold open rod changes from the locked configuration to the unlocked configuration.

18. The hold open rod of claim 17, wherein the locked indicator is exposed when the hold open rod is in the locked configuration and is concealed when the hold open rod is in the unlocked configuration, and wherein the unlocked indicator is exposed when the hold open rod is in the unlocked configuration and is concealed when the hold open rod is in the locked configuration.

19. The hold open rod of claim 18, wherein the locked indicator and unlocked indicator are each at least one of a visual indicator and a tactile indicator formed on the lock body.

20. The hold open rod of claim 17, wherein the outer collar assembly is configured to hold the collar locking pin and the inner collar.

21. The hold open rod of claim 20, further comprising a second spring arranged within the outer collar assembly and around the lock body,
wherein the second spring is compressed when the hold open rod is in the unlocked configuration.

22. The hold open rod of claim 21, wherein the inner collar is located between the first spring and the second spring.

23. The hold open rod of claim 21, wherein the inner collar is located between the first spring and the second spring.

24. The hold open rod of claim 21, further comprising a collar locking pin housing configured to house the collar locking pin.

25. The hold open rod of claim 21, wherein the first spring and the second spring are wave springs.

* * * * *